H. LIECHTY.
LOCOMOTIVE.
APPLICATION FILED NOV. 15, 1905.
970,512.
Patented Sept. 20, 1910.
2 SHEETS—SHEET 1.
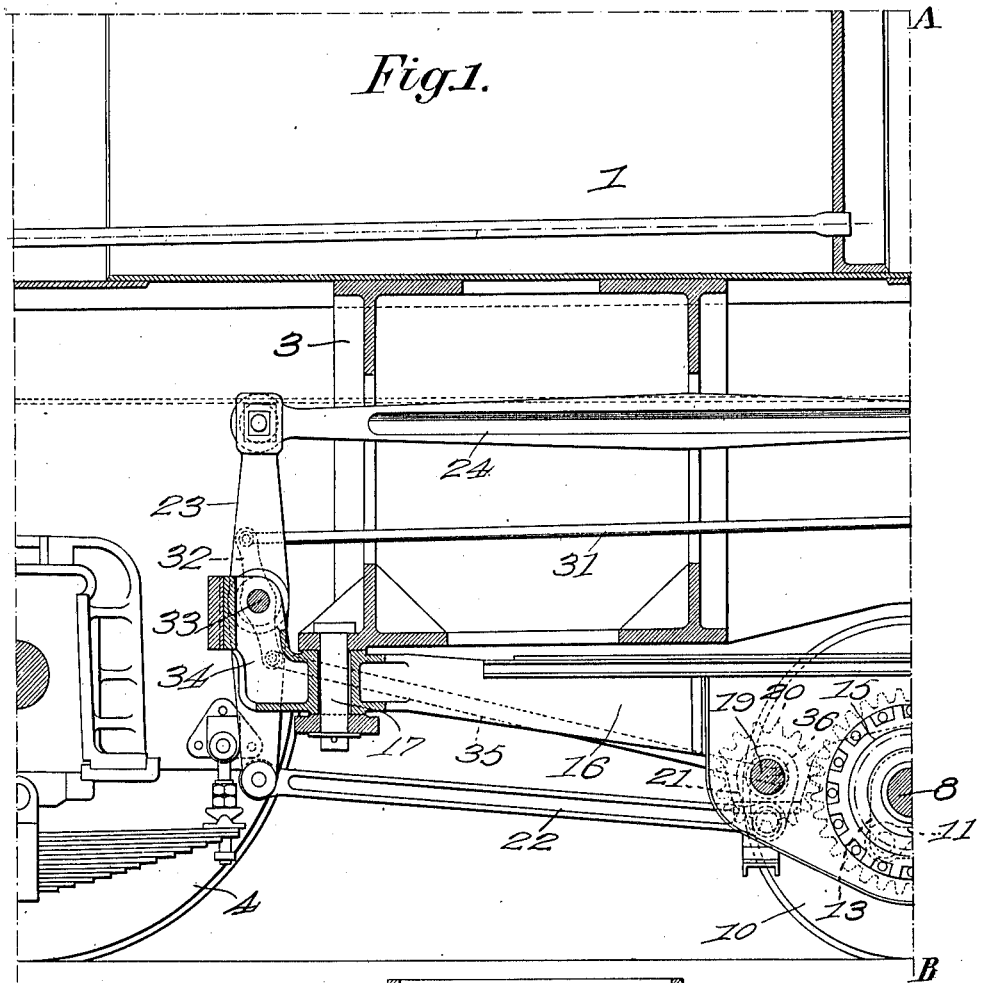
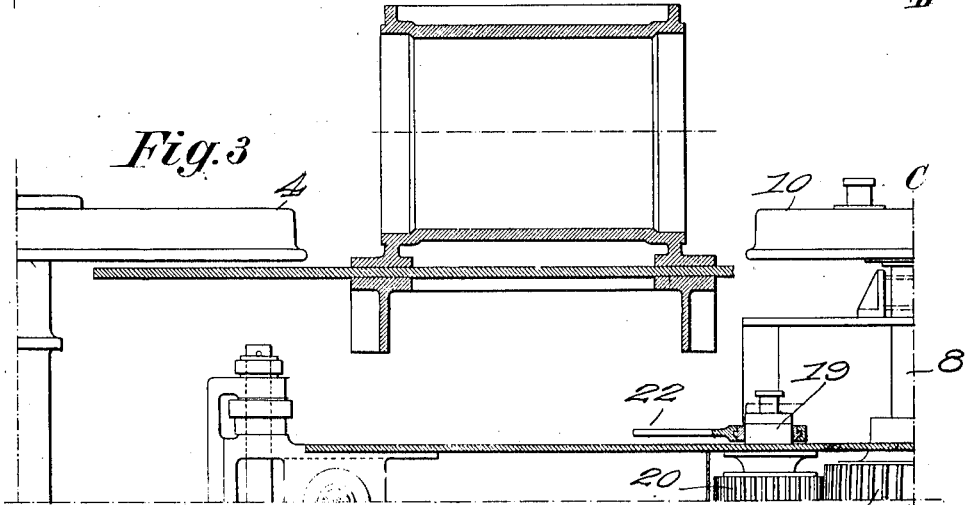

H. LIECHTY.
LOCOMOTIVE.
APPLICATION FILED NOV. 15, 1905.
970,512.
Patented Sept. 20, 1910.
2 SHEETS—SHEET 2.
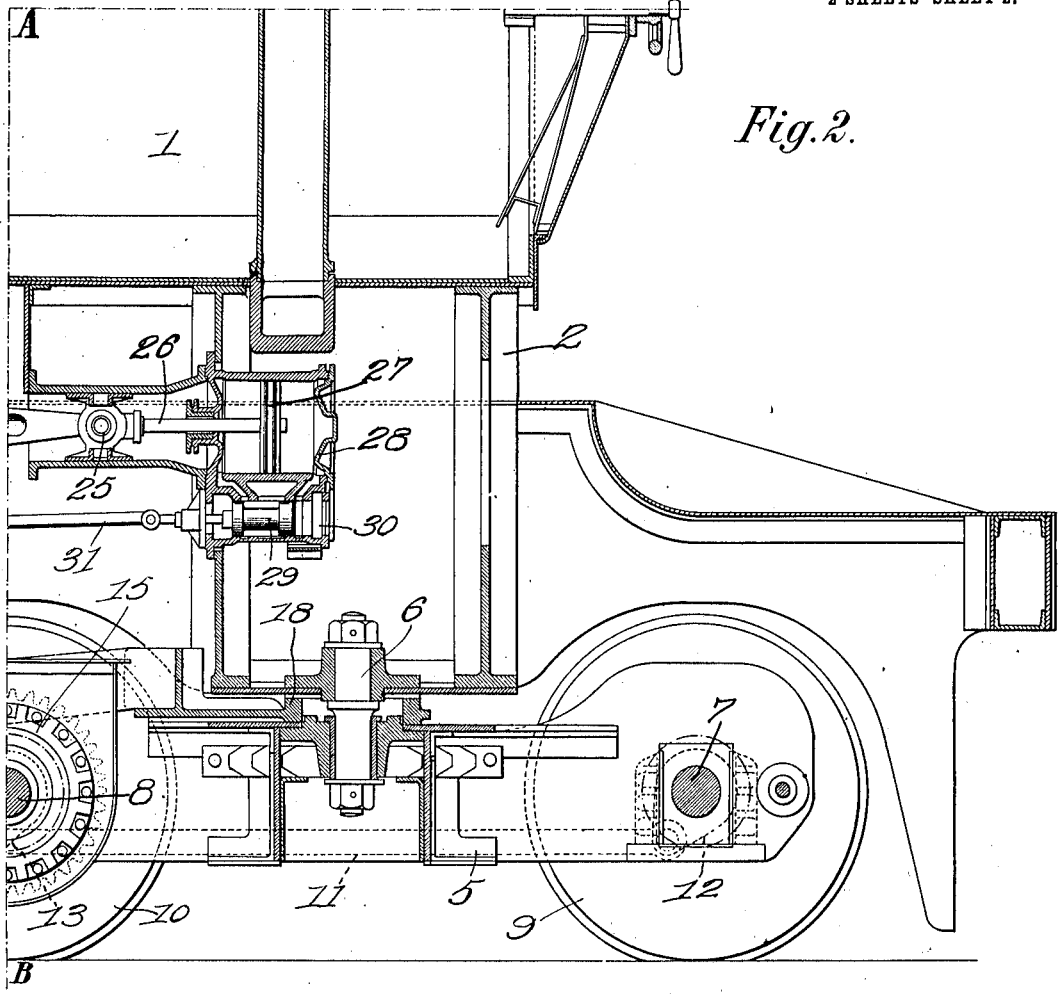
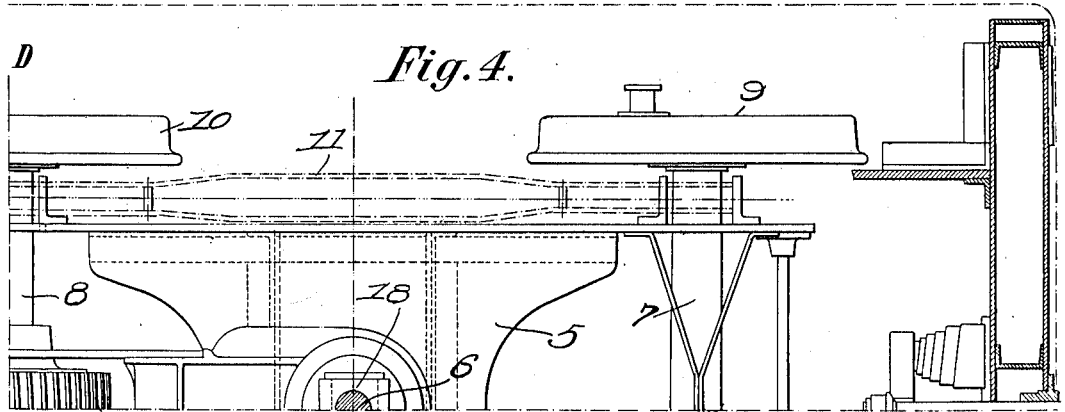
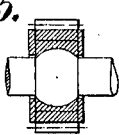

UNITED STATES PATENT OFFICE.

HERMANN LIECHTY, OF BERNE, SWITZERLAND.

LOCOMOTIVE.

970,512.  Specification of Letters Patent.  Patented Sept. 20, 1910.

Application filed November 15, 1905. Serial No. 287,529.

*To all whom it may concern:*

Be it known that I, HERMANN LIECHTY, a citizen of the Swiss Confederacy, and resident of Berne, Switzerland, have invented certain new and useful Improvements in Locomotives, of which the following is a specification.

This invention relates to improvements in locomotive engines and has to do more particularly with engines designed to operate upon rails although the invention is not limited to this particular class of engines.

The primary object of the invention is to afford means whereby the tractive power of an engine may be either temporarily or permanently increased and to this end it is proposed to utilize the tractive power of the engine truck or other wheels which normally run idle to assist in starting or to be operated permanently in connection with the drivers.

The invention consists in an improved means for positively propelling such idler or truck wheels for the purpose hereinbefore set forth and the invention will be more fully described in connection with the accompanying drawing and will be more particularly pointed out and ascertained in and by the appended claims.

In the drawings:—Figures 1 and 2, taken as a whole, illustrate the forward end of a locomotive in vertical longitudinal sections with the device of my invention applied to the front truck. Figs. 3 and 4, viewed together, are a horizontal sectional view of the structure shown in Fig. 1. Figs. 5 and 6 are detail sectional views of an improved form of gear mounting.

Like characters of reference designate similar parts throughout the different figures of the drawings.

As shown 1 designates as a whole the forward end of the boiler of a locomotive engine. The boiler bolster is indicated at 2 and a portion of the frame structure is indicated at 3, the forward portion of one of the drivers 4 being indicated for the sake of clearness. The forward truck is indicated at 5 as being pivotally mounted or connected at 6 to the bolster 2. The truck 5 is provided with axles 7 and 8 on which are mounted the truck wheels indicated at 9 and 10. Means are provided, preferably in the form of a connecting link 11 and cranks 12 and 13, for connecting the wheels of the truck 5 so that they will rotate in unison so that when power is applied to one axle it will be communicated to the other axle and the tractive power of all the wheels will be in service. The axle 8 is provided with a gear wheel 14 the teeth of which are formed on an arc whose center is coincident with the pivotal connection 6 of the truck. Preferably said wheel 14 is loosely mounted on the axle 8 and means are provided for coupling and uncoupling said gear with and from said axle, said means being preferably in the form of a clutch which is indicated at 15. Said clutch is not shown in detail as its specific structure forms no part of the present invention and no means are herein shown for operating the clutch for the reason that such means may be varied to suit the requirements.

An auxiliary frame or support 16 is provided and said support is desirably pivotally mounted at 17 to the frame structure 3 at one end and at its other end said support is movably mounted at 18 on the truck 5. Said support 16 carries a crank shaft 19 on which is mounted a gear 20 adapted to mesh with gear 14. Said shaft 20 also carries a crank gear 14. Said shaft 20 also carries a crank 21 to which one end of a connecting rod 22 is secured. Said rod 22 is secured at its other end to a pitman lever 23 to the other end of which a pitman 24 is secured. Said pitman 24 is connected with a cross-head 25 to which the piston rod 26 of a piston 27 is secured. Said piston 27 operates in an auxiliary cylinder 28 to which fluid pressure is admitted and cut off by a slide valve 29 operating in a valve chest 30. The main operating cylinders are not herein shown as they may be of the usual construction and form no part of the present invention. Said valve 29 is connected with a valve rod 31 which latter is connected with a valve lever 32. Conveniently said levers 23 and 32 are mounted upon a shaft 33 journaled in a support 34 rising from the auxiliary frame 16. A connecting rod 35 is connected with said lever 32 at one end and at its other end said rod is eccentrically mounted or connected with the crank shaft 19 at 36.

The cylinder and piston hereinbefore described constitute a source of power which is connected with the supporting or truck wheels and means are provided, which as shown is in the form of a clutch, for throwing said wheels into or out of driving relation with respect to the source of power. It will also be noted that means are provided for connecting the wheels of the truck with the valve 29 for controlling the admission of pressure fluid to the cylinder 28. It will be obvious that the connection between the crank shaft 19 and the axle 8 will permit the truck 5 to swing or turn about its axis, when the locomotive is passing a curved portion of track as the concave or arc shaped teeth of the gear 14 will permit of limited relative movement of the gear wheel 14 with respect to the gear wheel 20 and still maintain mesh engagement.

It will be understood that any suitable means may if desired be provided for turning the pressure fluid traveling to the cylinder 30 on and off and that such means together with the means for operating the clutch 15 may be disposed in such a manner as to be accessible to the engineer but as these structural features form no part of the present invention they need not be shown and described in detail.

The device of my invention is adapted for use either in connection with passenger or freight engines as in the first instance the device of the invention would be very advantageous in starting and also in getting a heavy passenger train up to speed whereupon it could be thrown out of gear while in the latter instance it would greatly increase the normal tractive power of a freight engine and would enable the maintenance of a much higher speed on graded portions of the road-bed.

I claim:—

1. A locomotive engine provided with a frame structure, a supporting truck pivotally connected to said frame and provided with a plurality of axles and wheels, means for connecting said axles to cause the same to rotate in unison, a gear mounted on one of said axles, a clutch for coupling and uncoupling said gear to and from said axle, the teeth of said gear being arched on a center coincident with the pivotal mounting of said truck, an auxiliary frame pivotally mounted on said locomotive frame at one end and movably mounted on said truck at the other end, the mounting of said frame having its axis coincident with the axis of said truck mounting, a crank shaft mounted in said auxiliary frame and provided with a crank, a gear mounted on said shaft and adapted to mesh with said first mentioned gear, an auxiliary cylinder provided with a piston, means connecting said piston with said crank whereby power may be transmitted to said truck, a valve for said cylinder, and means connecting said valve with said shaft whereby the admission of pressure fluid may be controlled.

2. In combination, a locomotive engine provided with a frame structure, a supporting truck pivotally connected to said frame and provided with a plurality of axles and wheels, means for connecting said axles to cause the same to rotate in unison, a gear mounted on one of said axles, a clutch for coupling and uncoupling said gear to and from said axle, an auxiliary frame pivotally mounted on said locomotive frame on one end and movably mounted on said truck at the other end, a crank shaft mounted in said auxiliary frame and provided with a crank, a gear mounted on said crank shaft and adapted to mesh with said first mentioned gear, a cylinder provided with a piston, means connecting said piston with said crank whereby power may be transmitted to said truck, a valve for said cylinder, and means connecting said valve with said crank shaft whereby admission of pressure fluid may be controlled.

3. In combination, a locomotive engine provided with a frame structure, a supporting truck pivotally connected to said frame and provided with a plurality of axles and wheels, means for connecting said wheels to cause the same to rotate in unison, a gear mounted on one of said axles, a clutch for coupling and uncoupling said gear to and from said axle, an auxiliary frame, a crank shaft mounted in said frame and provided with a crank, a gear mounted on said crank shaft and adapted to mesh with said first mentioned gear, an auxiliary cylinder provided with a piston, means connecting said piston with said crank whereby power may be transmitted to said truck wheels, a valve for said cylinder, and means connecting said valve with said crank shaft whereby admission of pressure fluid may be controlled.

4. In combination, a locomotive engine provided with a frame structure, a supporting truck movably connected with said frame and provided with a plurality of axles and wheels, means for connecting said wheels to cause the same to rotate in unison, a gear mounted on one of said axles, means for coupling said gear to and from said axle, an auxiliary frame, a crank shaft mounted in said frame, a gear mounted on said crank shaft and adapted to mesh with said first mentioned gear, and an auxiliary source of power connected with said crank shaft.

5. In combination, a locomotive engine, a movably mounted supporting truck therefor provided with a plurality of axles and wheels, means whereby said wheels are caused to rotate in unison, a gear mounted on one of said axles, means for coupling and uncoupling said gear to and from said axle, a crank shaft provided with a gear meshing with said first mentioned gear, and an auxiliary source of power connected with said crank shaft.

6. In combination, a locomotive engine, a movably mounted supporting truck therefor provided with a plurality of axles and wheels, means whereby said wheels are caused to rotate in unison, an auxiliary source of power for the engine, means mounted partly on said engine and said truck whereby power may be transmitted from said auxiliary source of power to said wheels, said means permitting movement of said truck and retaining driving connection with wheels thereof, and a device whereby said means may be thrown into or out of driving relation with said wheels.

7. In combination, a locomotive engine, a movably connected supporting truck therefor provided with wheels and axles connected to rotate in unison, an auxiliary source of power for the engine, means for connecting said source of power in driving relation with said truck wheels, said means permitting relative movement of the truck with respect to the engine and maintaining driving connection between the same, and a device whereby said means may be thrown into and out of driving relation with said wheels.

8. In combination, a locomotive engine, a movably connected supporting truck therefor provided with wheels and axles, an auxiliary source of power for the engine, and means mounted partly on said engine and partly on said truck whereby power may be transmitted from said source of power to said wheels, said means permitting relative movement of said truck with respect to said engine and maintaining driving connection between the same.

In testimony whereof I have hereunto set my hand in presence of two witnesses.

HERMANN LIECHTY.

Witnesses:
   JOSEPH WYSS,
   PAUL HAMMIT.